US009175743B2

(12) United States Patent
Kim et al.

(10) Patent No.: US 9,175,743 B2
(45) Date of Patent: Nov. 3, 2015

(54) LAUNDRY PROCESSING APPARATUS HAVING UPPER AND LOWER BALANCERS

(75) Inventors: Youngjong Kim, Kyungsangnam-do (KR); Hyuksoo Lee, Kyungsangnam-do (KR); Seongno Yoon, Kyungsangnam-do (KR); Dongyoon Kim, Kyungsangnam-do (KR); Dongmin Kim, Kyungsangnam-do (KR)

(73) Assignee: LG ELECTRONICS INC., Seoul (KR)

( * ) Notice: Subject to any disclaimer, the term of this patent is extended or adjusted under 35 U.S.C. 154(b) by 1065 days.

(21) Appl. No.: 13/256,183

(22) PCT Filed: Mar. 19, 2010

(86) PCT No.: PCT/KR2010/001717
§ 371 (c)(1),
(2), (4) Date: Dec. 29, 2011

(87) PCT Pub. No.: WO2010/107277
PCT Pub. Date: Sep. 23, 2010

(65) Prior Publication Data
US 2012/0144875 A1  Jun. 14, 2012

(30) Foreign Application Priority Data

Mar. 20, 2009 (KR) .................... 10-2009-0024099
Jul. 30, 2009 (KR) .................... 10-2009-0070053
Nov. 9, 2009 (KR) .................... 10-2009-0107659

(51) Int. Cl.
*F16F 15/36* (2006.01)
*D06F 37/20* (2006.01)
*D06F 37/24* (2006.01)

(52) U.S. Cl.
CPC ............ *F16F 15/363* (2013.01); *D06F 37/206* (2013.01); *D06F 37/245* (2013.01)

(58) Field of Classification Search
CPC .... F16F 15/363; D06F 37/206; D06F 37/245; D06F 37/225; D06F 37/269
See application file for complete search history.

(56) References Cited

U.S. PATENT DOCUMENTS

| 5,419,164 A | * | 5/1995 | Durazzani | ................... 68/23.2 |
| 2006/0101864 A1 | * | 5/2006 | Namkung et al. | .............. 68/3 R |
| 2006/0254321 A1 | * | 11/2006 | Lim et al. | ................... 68/12.01 |
| 2007/0277560 A1 | * | 12/2007 | Kim et al. | ................... 68/23.1 |

FOREIGN PATENT DOCUMENTS

| JP | 4-40998 A | 2/1992 |
| KR | 10-1998-0067195 A | 10/1998 |

(Continued)

OTHER PUBLICATIONS

Translation of KR 1019980067195 provided from KIPO, pp. 1-7.*

*Primary Examiner* — Michael Barr
*Assistant Examiner* — Rita Adhlakha
(74) *Attorney, Agent, or Firm* — Birch, Stewart, Kolasch & Birch, LLP

(57) ABSTRACT

The present invention relates to a laundry processing apparatus. In particular, the laundry processing apparatus comprises: a cabinet; an outer chamber provided within the cabinet and in which wash water is filled; an inner chamber rotatably provided within the outer chamber to hold laundry; an upper balancer disposed at an upper portion of the inner chamber; and a lower balancer disposed at a lower portion of the inner chamber, wherein either the upper balancer or the lower balancer is a liquid balancer filled with liquid, and the other balancer is a ball balancer having a ball therein, such that the advantages of maximized balancing results and an effective reduction in vibration may be achieved.

17 Claims, 9 Drawing Sheets

(56) References Cited

FOREIGN PATENT DOCUMENTS

| KR | 10-1998-067195 A | 10/1998 |
| KR | 10-1999-0005540 A | 1/1999 |
| KR | 10-0182129 B1 | 5/1999 |
| KR | 10-1999-0052649 A | 7/1999 |

* cited by examiner

LAUNDRY PROCESSING APPARATUS HAVING UPPER AND LOWER BALANCERS

TECHNICAL FIELD

The present invention relates to a laundry processing apparatus, and, more particularly, to a laundry processing apparatus that is capable of reducing vibration generated during rotation of an inner tub and increasing the volume of the inner tub.

BACKGROUND ART

Generally, a laundry processing apparatus may be classified as a washing machine that removes contaminants from clothes, bedclothes and the like (hereinafter, referred to as "laundry") using water, detergent and mechanical action, a drying machine that dries wet laundry using hot dry air heated by a heater and mechanical action, or a washing and drying machine that washes and dries laundry.

A washing machine may be classified as a top load type washing machine configured so that a laundry introduction hole, through which laundry is introduced or removed, is formed at the top of a cabinet, and washing is performed by circulation of water generated during rotation of an inner tub or a drum type washing machine configured so that a laundry introduction hole is formed at the front of a cabinet, and washing is performed by tumbling of laundry generated during rotation of an inner tub.

A conventional top load type washing machine includes an outer tub to contain wash water, an inner tub disposed in the outer tub to wash laundry placed therein, and a motor disposed below the outer tub to rotate the inner tub. At the upper part of the inner tub is mounted a hydraulic balancer to reduce vibration generated by non-uniform distribution of laundry.

In the conventional top load type washing machine, however, the hydraulic balancer is mounted only at the upper part of the inner tub, and therefore, rotational moment is generated due to non-uniform distribution of laundry in the lower part of the inner tub with the result that the inner tub is vibrated vertically.

DISCLOSURE

Technical Problem

It is an object of the present invention to provide a laundry processing apparatus that is capable of reducing vibration generated during rotation of an inner tub.

It is another object of the present invention to provide a laundry processing apparatus having a balancer mounted at the lower part of the inner tub.

It is another object of the present invention to provide a laundry processing apparatus wherein the volume of the inner tub is increased.

It is another object of the present invention to provide a laundry processing apparatus wherein the strength of the inner tub is improved.

It is another object of the present invention to provide a laundry processing apparatus wherein a defect ratio of the inner tub is minimized.

It is yet another object of the present invention to provide a laundry processing apparatus wherein assembly of a balancer provided at the upper part of the inner tub is improved.

Technical Solution

In accordance with one aspect of the present invention, the above and other objects can be accomplished by the provision of a laundry processing apparatus including a cabinet, an outer tub provided in the cabinet to contain laundry, an inner tub rotatably provided in the outer tub to contain laundry, an upper balancer disposed at an upper part of the inner tub, and a lower balancer disposed at a lower part of the inner tub, wherein one of the upper and lower balancers is a hydraulic balancer having liquid contained therein, and the other is a ball balancer having balls contained therein.

Effects of the Invention

In the laundry processing apparatus according to the present invention, different kinds of balancers are mounted at the upper and lower parts of the inner tub, thereby maximizing a balancing effect and thus effectively reducing vibration.

Also, the laundry processing apparatus according to the present invention has the effect of reducing the amount of rotational moment generated by the balancers.

Also, the laundry processing apparatus according to the present invention has two balancers, and therefore, it is possible to reduce the volume of the upper balancer mounted at the upper part of the inner tub, thereby improving inner space utilization of a washing machine.

Also, in the laundry processing apparatus according to the present invention, the supporter, provided to fasten the balancer to the lower part of the inner tub, is fastened simultaneously when the hub and the drum base are fastened, thereby simplifying an assembly process and reducing the number of parts necessary to fasten the balancer to the inner tub.

Also, in the laundry processing apparatus according to the present invention, the balancers are mounted at the upper and lower parts of the inner tub, thereby improving a balancing effect.

Also, in the laundry processing apparatus according to the present invention, the beaded part is formed at the upper part of the inner tub, thereby increasing the strength of the inner tub and thus preventing the inner tub from being bent or twisted.

Also, in the laundry processing apparatus according to the present invention, the upper balancer is placed on the beaded part so that the upper balancer can be supported by the beaded part. Consequently, the present invention has the effect of stably installing the upper balancer and easily installing the upper balancer. In addition, no additional supporter to support the upper balancer is needed. Consequently, the structure of the laundry processing apparatus is simple, and the manufacturing cost of the laundry processing apparatus is decreased.

Also, the laundry processing apparatus according to the present invention has the effect of preventing defects of the seamed part generated when the beaded part is formed in a state in which the inner tub is seamed.

Also, in the laundry processing apparatus according to the present invention, it is possible for the beaded part to stably support the upper balancer while not obstructing the introduction and removal of laundry.

BEST MODE

Now, a top load type washing machine (hereinafter, referred to as a 'washing machine'), as an example of a laundry processing apparatus according to the present invention, will be described in detail with reference to the accompanying drawings.

Figure 1:
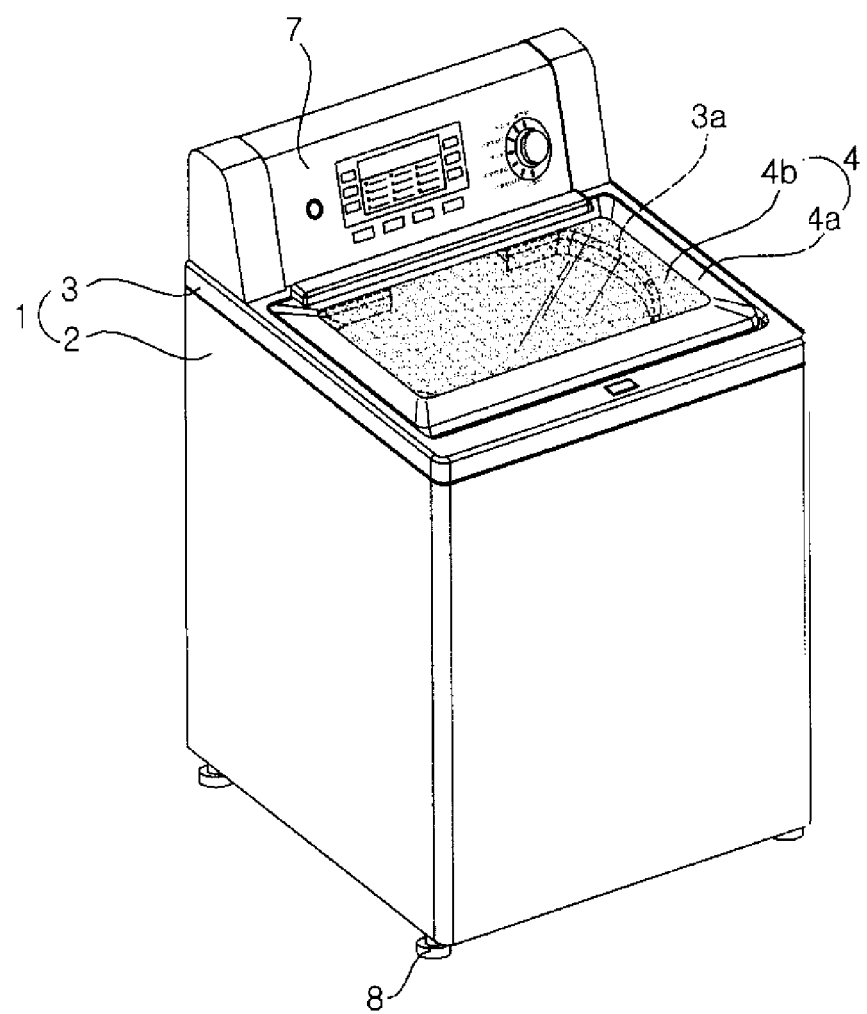
FIG. 1 is a perspective view showing a top load type washing machine according to an embodiment of the present invention.
Figure 2:
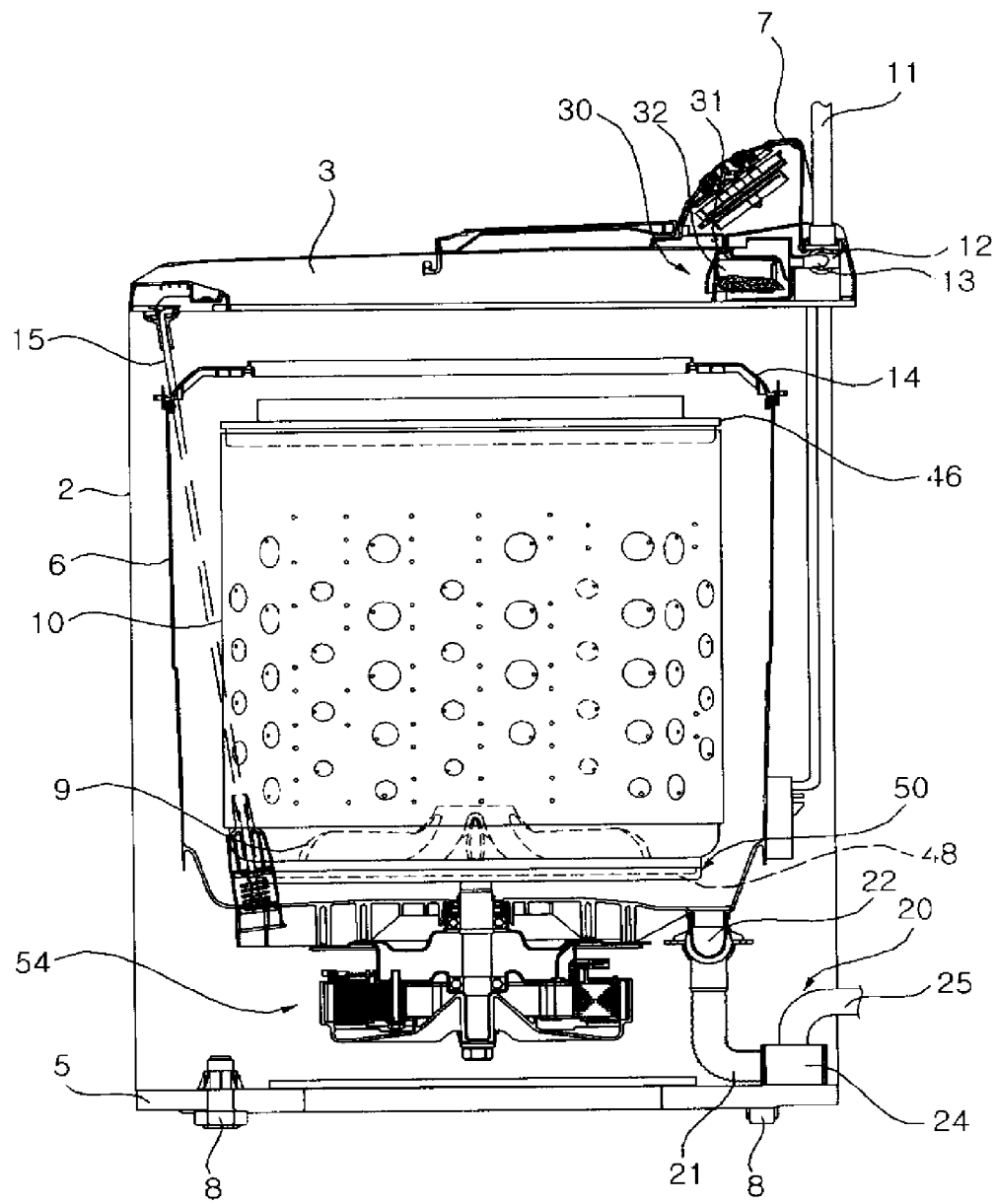
FIG. 2 is a vertical sectional view of the washing machine shown in FIG. 1.

FIG. 1 is a perspective view showing a top load type washing machine according to an embodiment of the present invention, and FIG. 2 is a vertical sectional view of the washing machine shown in FIG. 1.

Referring to FIGS. 1 and 2, the washing machine according to this embodiment of the present invention includes a case 1 forming the outer appearance of the washing machine and a leg assembly 8 coupled to the bottom of the case 1.

The case 1 includes a cabinet 2 open at the top and bottom thereof to form the side of the washing machine, a top cover 3 disposed to cover the open top of the cabinet 2, and a base 5 mounted at the open bottom of the cabinet 2.

In the cabinet 2 are disposed an outer tub 6 to contain wash water, an inner tub 10 disposed in the outer tub 6 to contain laundry, a drive mechanism 54, such as a motor, to drive the inner tub 10, a water supply assembly to supply wash water into the outer tub 6, a drainage assembly 20 to drain wash water from the outer tub 6 upon completion of washing or spin-drying, and a detergent supply unit 30 connected to the water supply assembly to supply detergent upon the supply of wash water.

In the top cover 3 is formed a laundry introduction hole 3a through which laundry is introduced or removed. At the top cover 3 is mounted a door 4 to open and close the laundry introduction hole 3a. At least a portion of the door 4 may be formed of glass, through which the interior of the washing machine is viewable. That is, the door 4 includes a frame part 4a and a glass part 4b fitted in the frame part 4a. The glass part 4b may be formed of tempered glass or synthetic resin.

At one side of the top cover 3 is mounted a control panel 7 to input the operation of the washing machine and to display the operation state of the washing machine.

The outer tub 6 is disposed in the cabinet 2 so that the outer tub 6 is suspended from the inner upper part of the cabinet 2 via a suspension 15.

At the bottom of the inner tub 10 is mounted a pulsator 9 to agitate wash water contained in the outer tub 6.

At the upper side of the outer tub 6 is mounted an outer tub cover 14 to prevent the escape of laundry or the overflow of wash water from the outer tub 6.

The water supply assembly includes an external hose 11 to guide wash water, supplied through an external faucet, into the washing machine, a water supply valve 12 connected to the external hose 11 to allow or stop the supply of wash water therethrough, and a water supply hose 13 connected between the water supply valve 12 and the detergent supply unit 30. The water supply valve 12 and the water supply hose 13 form a water supply channel through which wash water is supplied.

The detergent supply unit 30 is disposed on the water supply channel. The detergent supply unit 30 includes a detergent box housing 31 disposed so as to communicate with the water supply hose 13, a detergent box 32 detachably mounted in the detergent box housing 31, and a detergent box cover fixed to the detergent box housing 31 and disposed at the top of the detergent box 32 to spray wash water.

The detergent box 32 is coupled to the detergent box housing 31 in such a manner that the detergent box 32 can be drawn out of the detergent box housing 31 so that a user can fill the detergent box 32 with detergent. The detergent box 32 may be coupled to the detergent box housing 31 so that the detergent box 32 can slide in the frontward-and-rearward direction.

The rear of the detergent box 32 is at least partially open so that, during the supply of wash water, detergent can be introduced into the detergent box housing 31 through the rear of the detergent box 32 together with the wash water.

The drainage assembly 20 includes a first drainage hose 21 connected to the bottom of the outer tub 6, a drainage valve 22 mounted on the first drainage hose 21 to allow or stop the drainage of wash water therethrough, a drainage pump housing 24 including a drainage pump to pump wash water, and a second drainage hose 25 connected to the drainage pump housing 24 to drain the wash water pumped by the drainage pump out of the cabinet 2.

In the drainage pump housing 24 is mounted a drainage motor to drive the drainage pump.

The drainage assembly 20 may be disposed between the outer tub 6 and the base 5.

Figure 3:
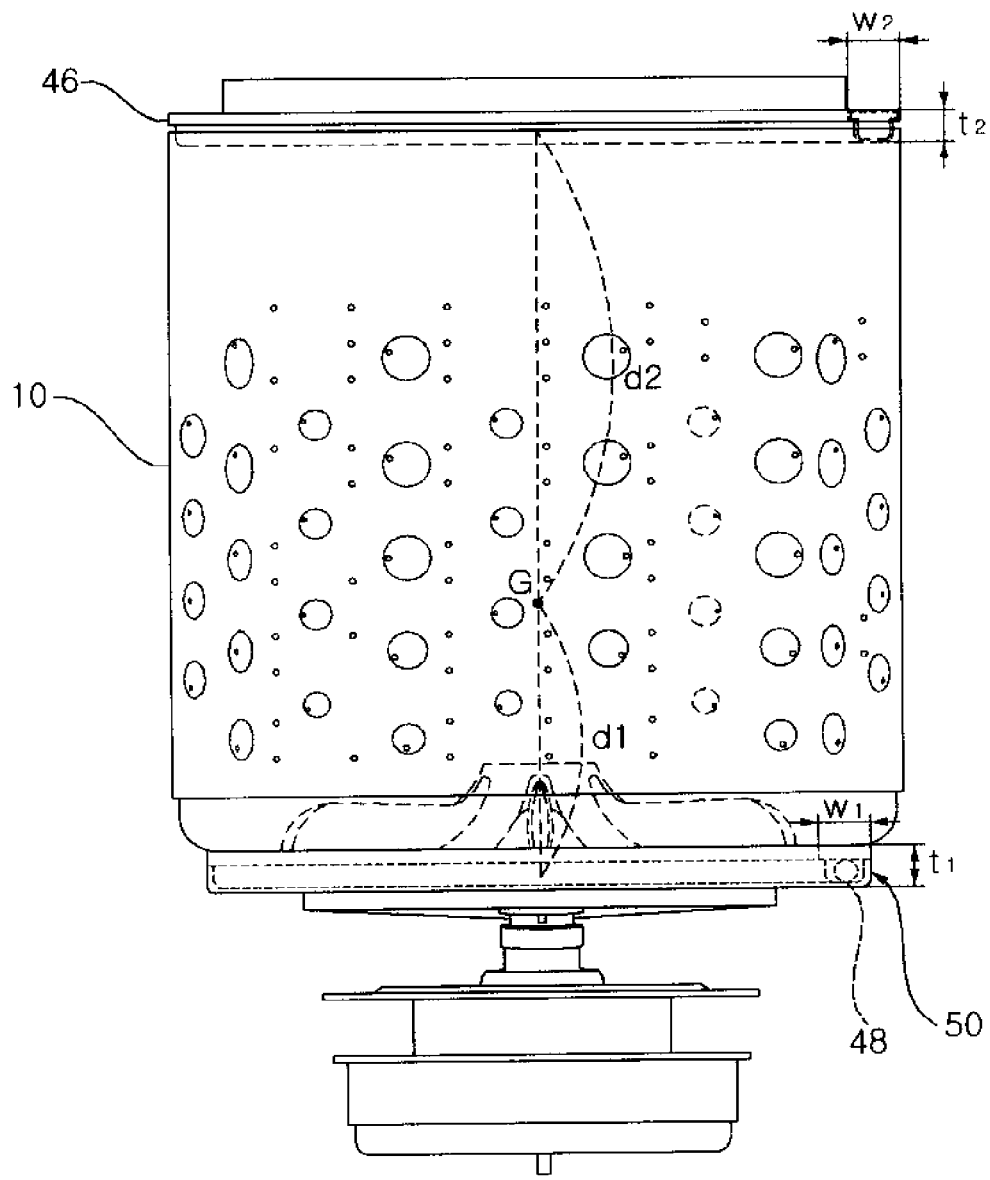
FIG. 3 is a view showing an inner tub and a balancer shown in FIG. 2.
Figure 4:
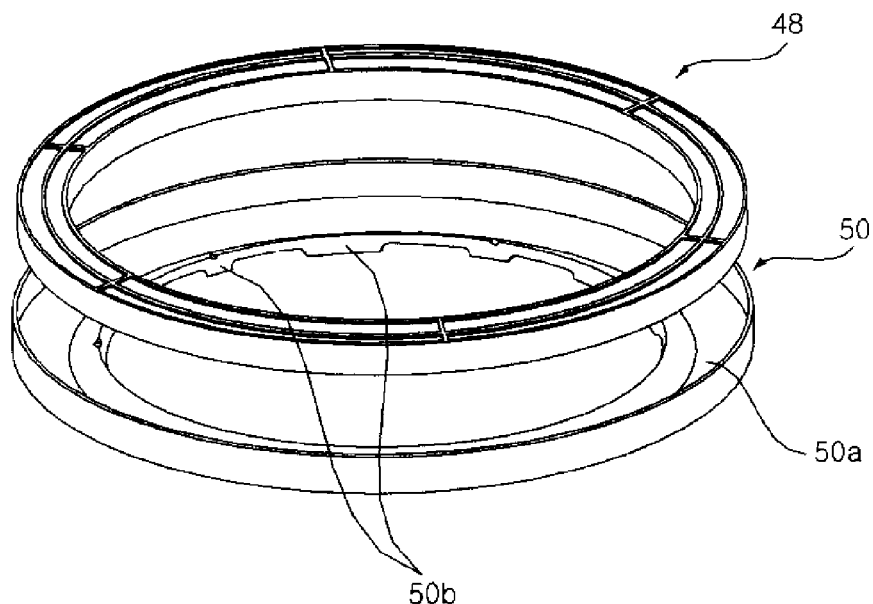
FIG. 4 is a perspective view showing a lower balancer and a lower balancer supporter shown in FIG. 3.
Figure 5:
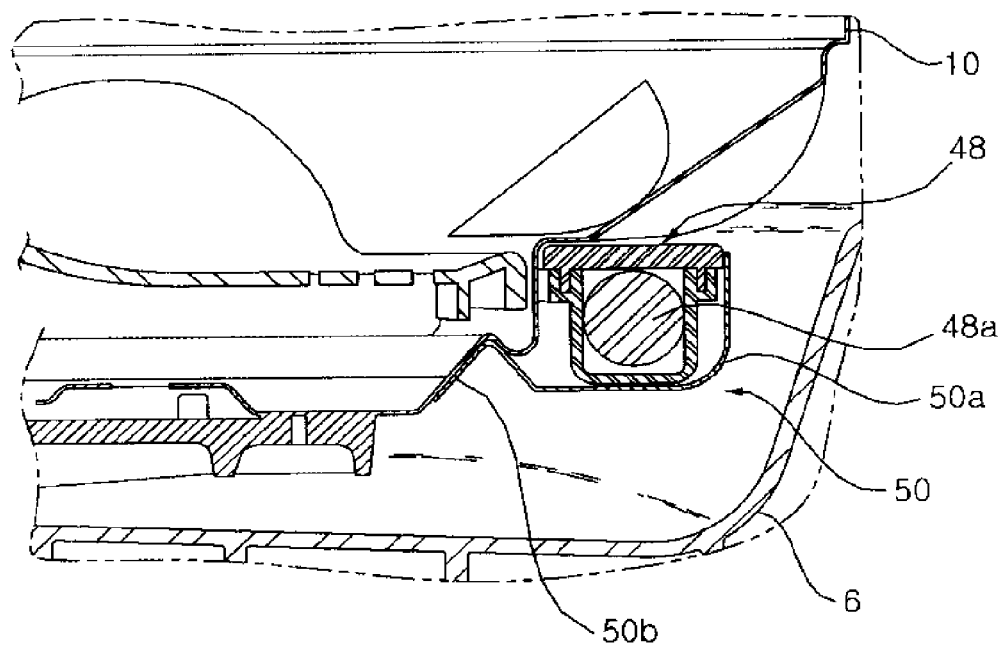
FIG. 5 is a partial sectional view of the lower balancer and the inner tub shown in FIG. 2.

FIG. 3 is a view showing the inner tub and a balancer shown in FIG. 2, FIG. 4 is a perspective view showing a lower balancer and a lower balancer supporter shown in FIG. 3, and FIG. 5 is a partial sectional view of the lower balancer and the inner tub shown in FIG. 2.

At the inner tub 10 is mounted a balancer to prevent the inner tub 10 from becoming unbalanced or vibrated due to non-uniform distribution of laundry.

The balancer may be mounted at the upper part or the lower part of the inner tub 10. In this embodiment, the balancer includes an upper balancer 46 mounted at the upper part of the inner tub 10 and a lower balancer 48 mounted at the lower part of the inner tub 10.

One of the upper and lower balances 46 and 48 is a hydraulic balancer containing liquid therein, and the other is a ball balancer in which balls are disposed. Distributed load may be generated in the hydraulic balancer due to uniform distribution of the liquid contained in the hydraulic balancer. On the other hand, concentrated load may be generated in the ball balancer due to non-uniform distribution of the balls disposed in the ball balancer.

In order to minimize rotational moment caused by concentrated load generated in the ball balancer, therefore, the ball balancer is preferably disposed at a position closer to the center of gravity G of the inner tub 10 than the hydraulic balancer.

That is, the vertical distance d1 between the center of gravity G of the inner tub 10 and the ball balancer may be less than the vertical distance d2 between the center of gravity G of the inner tub 10 and the hydraulic balancer.

Since the center of gravity G of the inner tub 10 is located at the lower part of the inner tub 10, a ball balancer is used as the lower balancer 48, and a hydraulic balancer is used as the upper balancer 46.

Also, since the upper balancer 46 is located at the upper part of the inner tub 10, smaller vertical thickness of the upper balancer 46 is advantageous in terms of inner space utilization of the washing machine.

Since the lower balancer 48 is provided in addition to the upper balancer 46 in this embodiment, it is possible to set the vertical thickness of the upper balancer 46 so that the vertical thickness of the upper balancer 46 is smaller than in the conventional case.

Also, the radial width w2 of the upper balancer 46 may be equal to the radial width w1 of the lower balancer 48, and the vertical thickness t2 of the upper balancer 46 may be less than the vertical thickness t1 of the lower balancer 48. Smaller vertical thickness t2 of the upper balancer 46 improves inner space utilization of the washing machine, thereby increasing the capacity of the washing machine.

The upper balancer 46 is a hydraulic balancer. The upper balancer 46 is formed in the shape of a ring. Liquid, such as salt water, is contained in the upper balancer 46. The upper balancer 46 is fastened to the upper part of the inner tub 10 by fastening members, such as screws.

The lower balancer 48 is a ball balancer. The lower balancer 48 is formed in the shape of a ring. A plurality of balls 48a is disposed in the lower balancer 48. The lower balancer 48 may be filled with silicone oil, which facilitates movement of the balls.

Referring to FIG. 4, on the other hand, the lower balancer 48 may be coupled to the lower part of the inner tub 10 by an additional lower balancer supporter 50.

The lower balancer supporter 50 is formed in the shape of a ring corresponding to the lower balancer 48. The lower balancer supporter 50 supports the lower part of the lower balancer 48.

The lower balancer supporter 50 is provided at the outer circumference thereof with a first flange part 50a, which is bent upward to surround the outer circumference of the lower balancer 49.

The lower balancer supporter 50 is provided at the inner circumference thereof with a second flange part 50b, which is bent so that the second flange part 50b is coupled to the inner tub 10 in a state in which the second flange part 50b is in contact with the inner tub 10.

The second flange part 50b is formed in a shape corresponding to the outer wall of the lower part of the inner tub 10. A plurality of second flange parts 50b may be formed at the inner circumference of the lower balancer supporter 50 at predetermined intervals.

The second flange part 50b may be fastened to the outer wall of the lower part of the inner tub 10 by fastening members, such as screws.

Since the upper balancer and the lower balancer are disposed at the upper part and the lower part of the inner tub, respectively, and different balancers are used as the upper balancer and the lower balancer, as described above, it is possible to effectively reduce vibration.

Also, it is possible to reduce the volume of the upper balancer, i.e. the hydraulic balancer, as compared with the conventional case.

Also, since the ball balancer is disposed at the lower part of the inner tub so that the ball balancer is close to the center of gravity of the inner tub, it is possible to reduce rotational moment.

Figure 6:
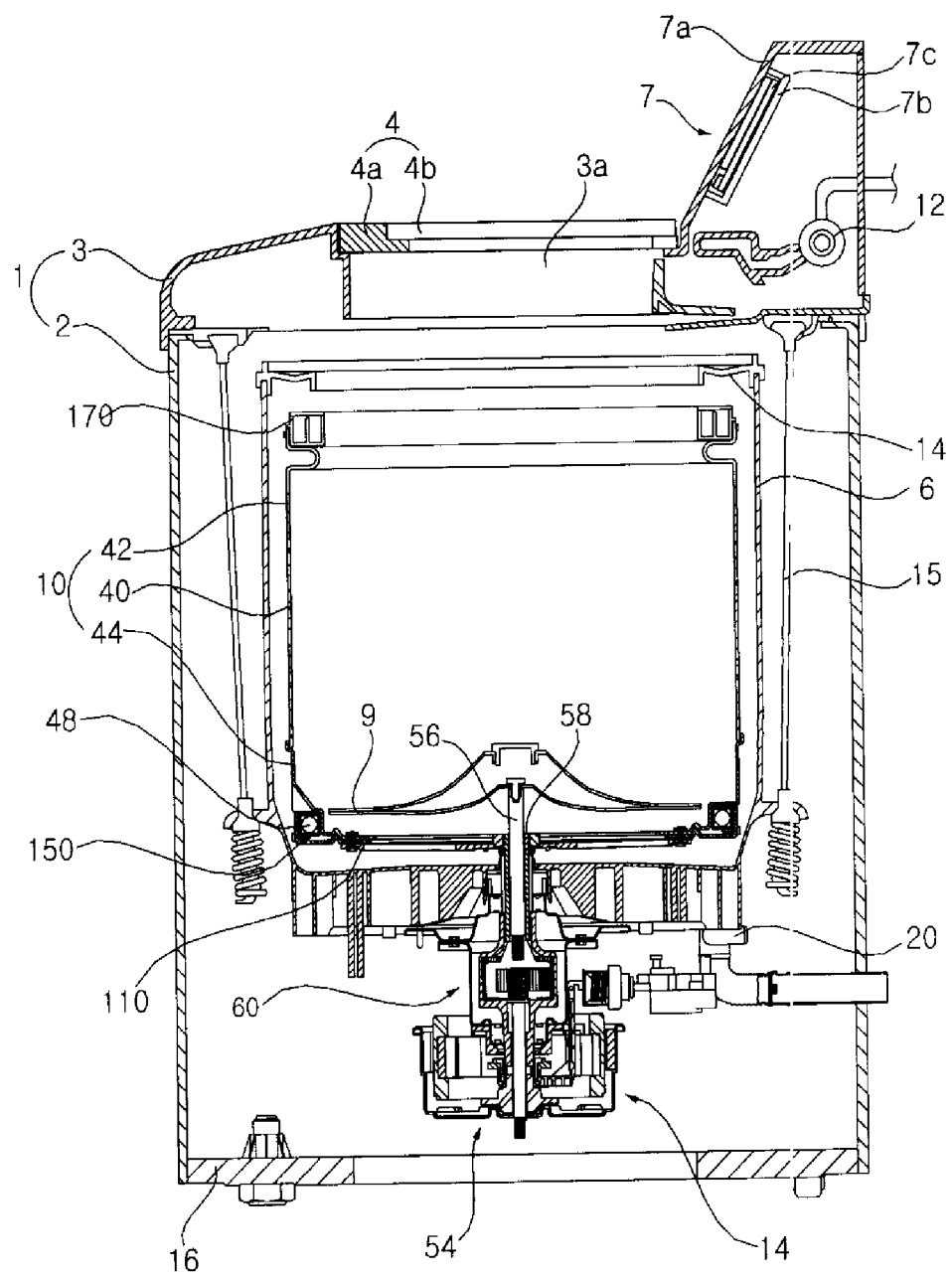
FIG. 6 is a sectional view showing a washing machine according to another embodiment of the present invention.
Figure 7:
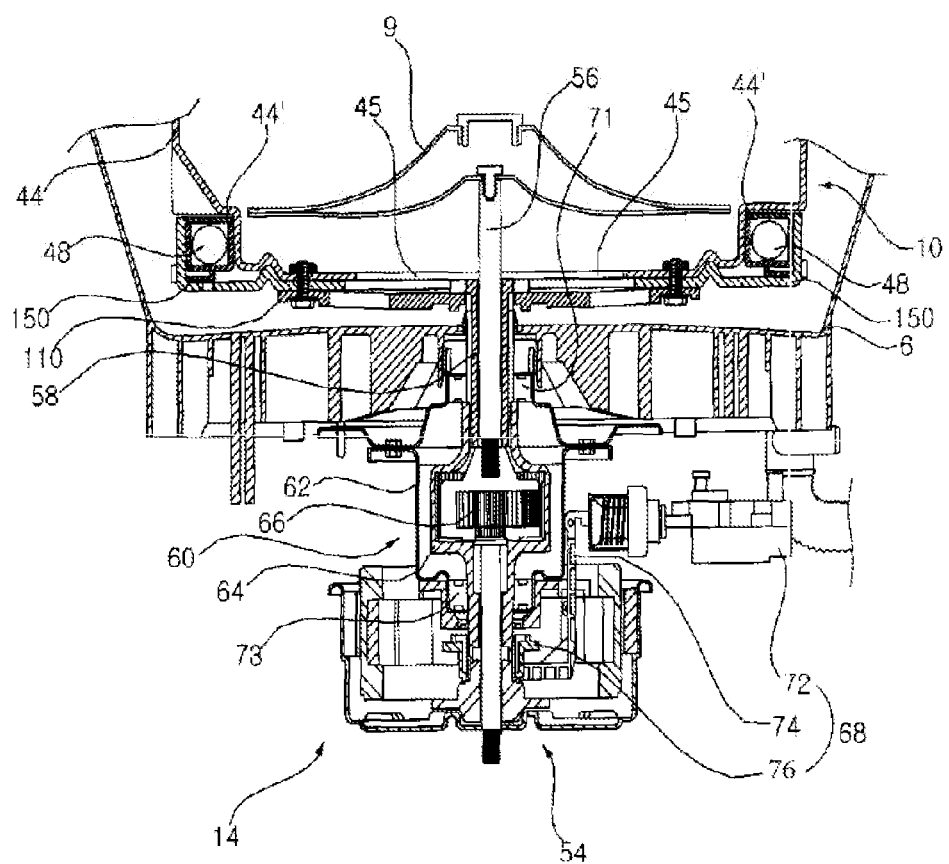
FIG. 7 is an enlarged sectional view of a drive mechanism shown in FIG. 6.

FIG. 6 is a sectional view showing a washing machine according to another embodiment of the present invention, and FIG. 7 is an enlarged sectional view of a drive mechanism shown in FIG. 6.

In this embodiment, as shown in FIGS. 6 and 7, the washing machine includes a case 1 forming the outer appearance of the washing machine. The case 1 includes a cabinet 2 open at the top and bottom thereof to form the side of the washing machine, a top cover 3 disposed to cover the open top of the cabinet 2, and a base 5 mounted at the open bottom of the cabinet 2.

In the cabinet 2 are disposed an outer tub 6 to contain wash water, an inner tub 10 rotatably disposed in the outer tub 6, a hub 110 connected to the inner tub 10, a pulsator 9 rotatably disposed at the inside bottom of the inner tub 10, and a drive mechanism 14 connected to the hub 110 and the pulsator 9 to rotate the inner tub 10 and the pulsator 9.

In the top cover 3 is formed a laundry introduction hole 3a through which laundry is introduced or removed. At the top cover 3 is mounted a door 4 to open and close the laundry introduction hole 3a. At least a portion of the door 4 may be formed of glass, through which the interior of the washing machine is viewable. That is, the door 4 includes a frame part 4a and a glass part 4b fitted in the frame part 4a. The glass part 4b may be formed of tempered glass or synthetic resin.

At one side of the top cover 3 is mounted a control panel 7 to input the operation of the washing machine and to display the operation state of the washing machine.

The control panel 7 includes a control body 7a having a display unit and an input unit, a control case 7b mounted in the control body 7a, and a control printed circuit board (PCB) 7c mounted at the control case 7b.

At the control PCB 7c are mounted a display, such as a light emitting diode (LED) assembly or a liquid crystal display (LCD), to display information through the display unit and a switch, such as a tact switch or a rotary switch, to input a command upon input through the input unit.

In the control body 7a is mounted a plurality of water supply valves 12 controlled by the control PCB 7c to supply water, such as hot water and cold water.

The door 4 opens the laundry introduction hole 3a during introduction or removal of laundry and closes the laundry introduction hole 3a during washing, rinsing and spin-drying of laundry. The door 4 is rotated upward and downward about the rear thereof to be opened and closed.

The outer tub 6 contains wash water or rinse water during washing or rinsing of laundry. The outer tub 6 contains water discharged from the inner tub 10 during spin-drying of laundry. The outer tub 6 is open at the top thereof so that laundry can be introduced or removed through the open top of the outer tub 6.

At the upper side of the outer tub 6 is mounted an outer tub cover 14 to prevent the escape of laundry or the overflow of wash water from the outer tub 6.

The outer tub 6 is disposed in the cabinet 2 so that the outer tub 6 is suspended from the inner upper part of the cabinet 2 via a suspension 15.

To the outer tub 6 is connected a drainage assembly 20 to drain wash water, rinse water or water separated from laundry as the result of spin-drying. The drainage assembly 20 includes a drainage valve controlled by the control PCB 7c and a drainage hose connected to the drainage valve.

The inner tub 10 is a washing tub in which laundry is placed. The inner tub 10 is open at the top thereof so that laundry can be introduced or removed through the open top of the inner tub 10. The inner tub 10 is rotatably disposed in the outer tub 6.

The inner tub 10 has a plurality of water holes 40 through which wash water or rinse water flows and through which water separated from laundry as the result of spin-drying is discharged from the inner tub 10.

The inner tub 10 includes an inner tub body 42 formed in the shape of a hollow cylinder to form the circumferential appearance of the inner tub 10 and an inner tub base 14 coupled to the lower part of the inner tub body 42 to form the lower appearance of the inner tub 10.

The inner tub base 44 is provided at the center thereof with a center hole 45, through which a pulsator shaft 56, which will be described below, extends and through which wash water, rinse water or water separated from laundry as the result of spin-drying flows.

The inner tub 10 is configured to have a double structure constituted by the inner tub body 42 and the inner tub base 44 to increase strength and improve convenience of manufacture due to the increase in size of the inner tub 10. The inner tub body 42 and the inner tub base 44 are made of a high-strength metal material, such as stainless steel. The inner tub body 42, made of stainless steel, and the inner tub base 44, made of stainless steel, are coupled to each other to constitute the inner tub 10.

Balancers 46 and 48 are mounted at the inner tub 10.

The balancers 46 and 48 are provided to prevent the inner tub 10 from becoming unbalanced or vibrated during the rotation of the inner tub 10. The balancers 46 and 48 include an upper balancer 46 mounted at the upper part of the inner tub 10 and a lower balancer 48 mounted at the lower part of the inner tub 10.

One of the upper and lower balances 46 and 48 is a hydraulic balancer containing liquid therein, and the other is a ball balancer in which balls are disposed. Distributed load may be generated in the hydraulic balancer due to uniform distribution of the liquid contained in the hydraulic balancer. On the other hand, concentrated load may be generated in the ball balancer due to non-uniform distribution of the balls disposed in the ball balancer.

In order to minimize rotational moment caused by concentration of load generated in the ball balancer, therefore, the ball balancer is preferably disposed at a position closer to the center of gravity G of the inner tub 10 than the hydraulic balancer.

Since the center of gravity G of the inner tub 10 is located at the lower part of the inner tub 10, a ball balancer is used as the lower balancer 48, and a hydraulic balancer is used as the upper balancer 46.

Also, since the upper balancer 46 is located at the upper part of the inner tub 10, smaller vertical thickness of the upper balancer 46 is advantageous in terms of inner space utilization of the washing machine.

Since the lower balancer 48 is provided in addition to the upper balancer 46, it is possible to reduce the vertical thickness of the upper balancer 46 as compared with a case in which only the upper balancer 46 is provided.

The upper balancer 46 is formed in the shape of a ring. Liquid, such as salt water, is contained in the upper balancer 46.

The upper balancer 46 may be mounted at the upper part of the inner tub 10 outside the inner tub 10. Alternatively, the upper balancer 46 may be mounted at the upper part of the inner tub 10 inside the inner tub 10.

In a case in which the upper balancer 46 is mounted at the upper part of the inner tub 10 outside the inner tub 10 in a protruding fashion, the outer tub or the upper balancer 46 may be damaged due to collision between the outer tub 6 and the upper balancer 46. On the other hand, in a case in which the upper balancer 46 is mounted at the upper part of the inner tub 10 inside the inner tub 10 in a protruding fashion, the upper balancer 46 may function as a laundry stopper to prevent the escape of laundry from the inner tub 10 while greatly reducing actual capacity of the inner tub 10. Preferably, therefore, the upper balancer 46 is mounted at the upper part of the inner tub 10 inside the inner tub 10.

The inner tub body 42 is provided at the upper part thereof with a beaded part 170, at which the upper balancer 46 is located, protruding toward the inner tub body 42. The upper balancer 46 is located at the beaded part 170 and is fastened to the upper part of the inner tub body 42 by fastening members, such as screws.

The lower balancer 48 is formed in the shape of a ring. At least one ball is disposed in the lower balancer 48. The lower balancer 48 may be filled with silicone oil, which facilitates movement of the ball.

The lower balancer 48 may be mounted at the lower part of the inner tub 10 outside the inner tub 10. Alternatively, the lower balancer 48 may be mounted at the lower part of the inner tub 10 inside the inner tub 10.

In a case in which the lower balancer 48 is mounted at the lower part of the inner tub 10 inside the inner tub 10, laundry may come into contact with the lower balancer 48 with the result that the laundry may be damaged by the lower balancer 48, or the pulsator 9 may come into contact with the lower balancer 48 with the result that the pulsator 9 or the lower balancer 48 may be damaged. On the other hand, in a case in which the lower balancer 48 is mounted at the lower part of the inner tub 10 outside the inner tub 10, laundry or the pulsator 9 does not come into contact with the lower balancer 48 with the result that the lower balancer 48 is not damaged. Preferably, therefore, the lower balancer 48 is mounted at the lower part of the inner tub 10 outside the inner tub 10.

The lower balancer 48 is mounted at a lower balancer supporter 150 coupled to the inner tub base 44 and/or the hub 110.

The inner tub base 44 is provided at the lower part thereof with a lower balancer receiving part 44' in which the lower balancer 48 is fitted.

The lower balancer receiving part 44' is depressed along the circumference of the inner tub base 44 at the bottom of the inner tub base 44 in the shape of a ring so that the lower balancer receiving part 44' protrudes toward the inside of the inner tub 10.

The lower balancer 48 and the lower balancer supporter 150 will be described below in detail.

A hub shaft 58, which will be described below, of the drive mechanism 14 is connected to the center of the hub 110, and a plurality of portions of the hub 110, excluding the center of the hub 110, is fastened to the inner tub base 44 by a plurality of fastening members. Consequently, rotational force transmitted through the hub shaft 58 is transmitted to the inner tub base 44 through the plurality of portions of the hub 110, excluding the center of the hub 110.

Since the hub 110 has the aforementioned structure, it is possible for the hub 110 to stably rotate the inner tub 10 even in a case in which the size of the inner tub 10 is large.

In a case in which an inner tub shaft (not shown) to rotate the inner tub 10 is directly connected to the center of the bottom plate of the inner tub base 44, and the size of the inner tub 10 is increased, the diameter of the inner tub base 44 is increased, and the distance between the inner tub shaft and the outer end of the inner tub base 44 is increased, with the result that the inner tub 10 may be greatly twisted or unbalanced, and therefore, the inner tub 10 may not be stably rotated.

On the other hand, in a case in which the plurality of portions of the hub 110, excluding the center of the hub 110, is coupled to the inner tub base 44, the inner tub 10 is little twisted or unbalanced, even when the size of the inner tub 10 is large, and therefore, the inner tub 10 is stably rotated.

The pulsator 9 is connected a pulsator shaft 56 so that the pulsator 9 is rotated in the inner tub 10 to circulate wash water or rinse water and laundry.

As shown in FIG. 3, the drive mechanism 14 rotates the pulsator 9 alone or simultaneously rotates the pulsator 9 and the inner tub 10. The drive mechanism 14 includes a motor 54, as a drive source, a pulsator shaft 56, as a washing shaft, connected to the pulsator 9, a hub shaft 59, as a spin-drying shaft, connected to the hub 110, and a clutch 60 to transmit drive force from the motor 54 to the pulsator 56 alone or to simultaneously transmit drive force from the motor 54 to the pulsator shaft 56 and the hub shaft 58.

The hub shaft 58 is a hollow shaft in which the pulsator shaft 56 is rotatably disposed.

The clutch 60 includes a bearing housing 62 fixed to the lower part of the outer tub 6 in a state in which the motor 54 is coupled to the lower end of the bearing housing 62, a carrier 64, rotatably disposed in the bearing housing 62, to which the hub shaft 58 is connected, a planetary gear set 66, disposed in the carrier 64, to which the pulsator shaft 56 is connected, to reduce power output from the motor 54, and a clutch mechanism 68 mounted below the carrier 66 to allow or stop the transmission of power between the motor 54 and the carrier 64.

In the bearing housing 62 is disposed a plurality of bearings 71 to rotatably support the carrier 64 and the hub shaft 58. The motor 54 is mounted at the bearing housing 62.

The motor 54 is mounted at the bearing housing 62 so that the motor 54 is disposed below the carrier 64 to drive the planetary gear set 66 in the carrier 64.

The clutch mechanism 68 includes a clutch motor 72 mounted at the bottom of the outer tub 6, a clutch lever 74 having one side connected to the clutch motor 72, and a clutch coupling 76, connected to the other side of the clutch lever 74, movably spline-coupled to the lower part of the carrier 64 to allow or stop the transmission of power between the motor 54 and the carrier 64.

That is, when the clutch motor 72 is driven in a pulsator rotation mode upon driving of the motor 54, the clutch lever 74 raises the clutch coupling 76 to separate the carrier 64 from a rotor of the motor 54. At this time, the planetary gear set 66 rotates the pulsator shaft 56, and the pulsator 9 is rotated by the pulsator shaft 56.

When the clutch motor 72 is driven in a pulsator and inner tub rotation mode upon driving of the motor 54, the clutch lever 74 lowers the clutch coupling 76 to connect the carrier 64 to the motor 54.

At this time, the pulsator 9 is rotated by the pulsator shaft 56, which is rotated by the planetary gear set 66, the carrier 64 is rotated along with the clutch coupling 76 to rotate the hub shaft 58, and the hub shaft 58 transmits rotational force to the hub 110 so that the inner tub 10 and the hub 110 can be simultaneously rotated.

Figure 8:
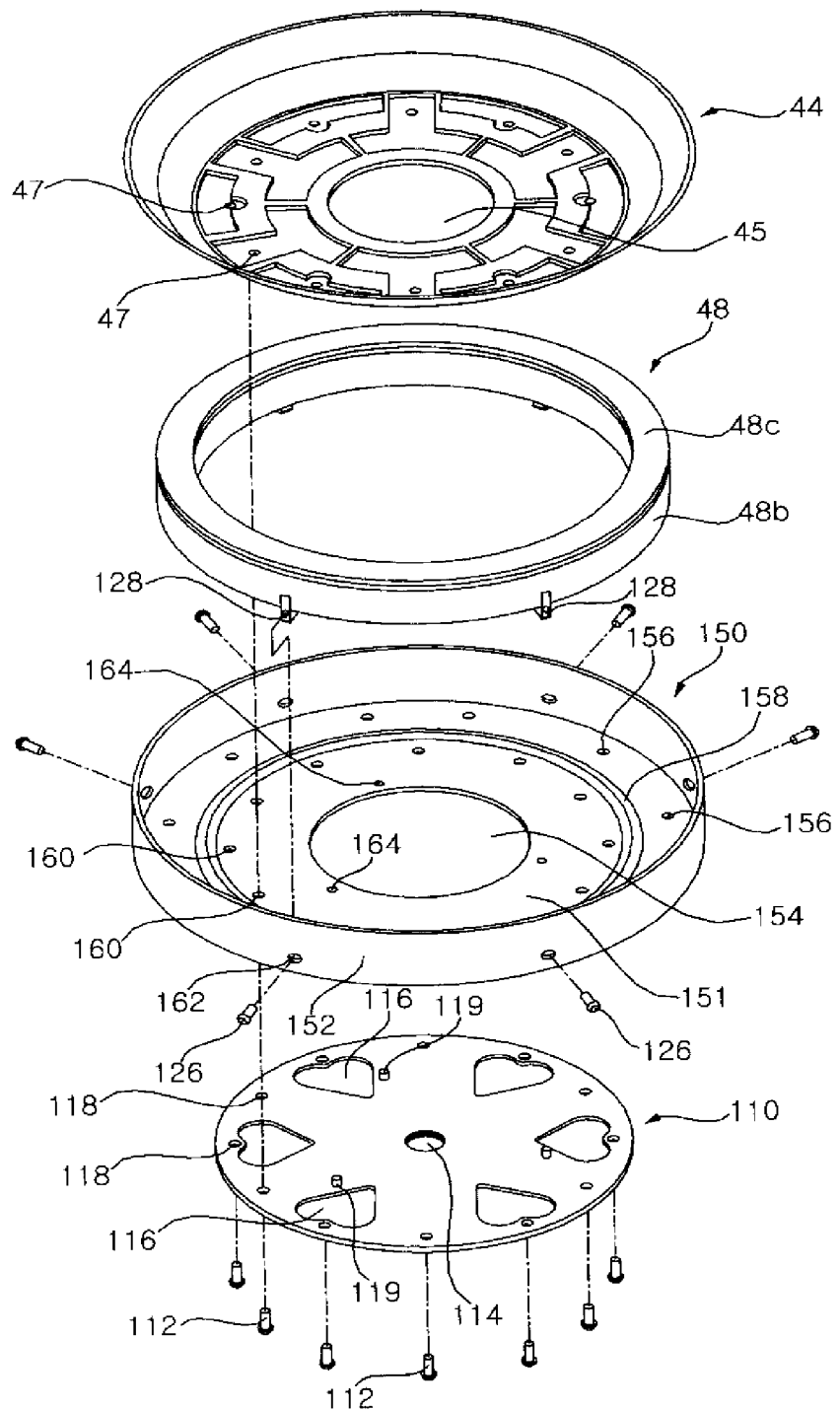
FIG. 8 is an exploded perspective view showing a process of assembling an inner tub base, a hub, a lower balancer supporter and a lower balancer shown in FIG. 6.
Figure 9:
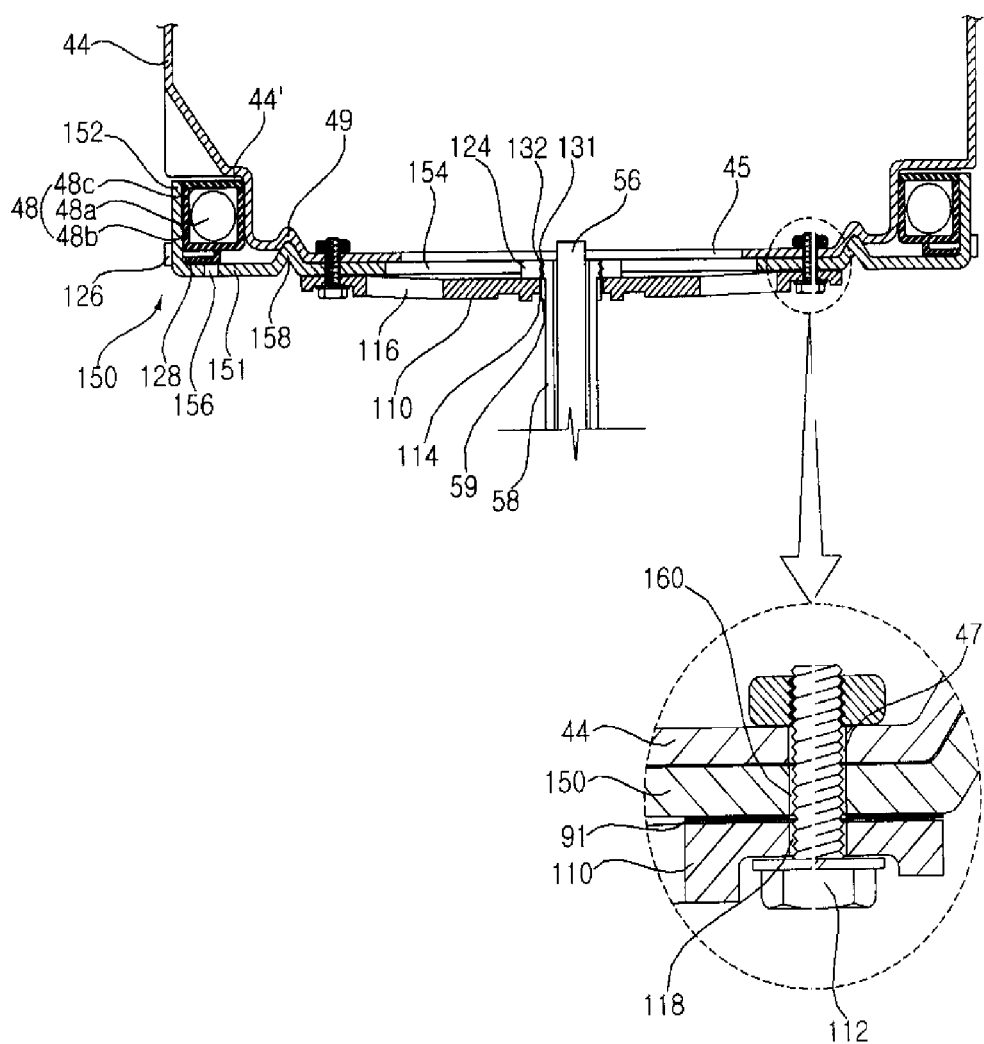
FIG. 9 is an enlarged sectional view showing an assembled state of the inner tub base, the hub, the lower balancer supporter and the lower balancer shown in FIG. 8.

FIG. 8 is an exploded perspective view showing a process of assembling the inner tub base, the hub, the lower balancer supporter and the lower balancer shown in FIG. 6, and FIG. 9 is an enlarged sectional view showing an assembled state of the inner tub base, the hub, the lower balancer supporter and the lower balancer shown in FIG. 8.

The hub shaft 58 is connected to the center of the hub 110, and a plurality of portions of the hub 110, in particular, a plurality of edge portions of the hub 110, excluding the center of the hub 110, is fastened to the inner tub base 44 by a plurality of fastening members 112. Consequently, rotational force transmitted through the center of the hub 110 is transmitted to the inner tub base 44 through the plurality of portions of the hub 110, excluding the center of the hub 110, i.e. the portions of the hub 110 at which the fastening members 112 are fastened.

A serration 59 is formed at the outer circumference of the hub shaft 58 at the upper part of the hub shaft 58. A serration 114 corresponding to the serration 59 is directly formed at the center of the hub 110. Alternatively, a bushing having such a serration 114 may be mounted at the center of the hub 110.

A male screw 131 is formed at the outer circumference of the hub shaft 58 at the upper end of the hub shaft 58. The male screw 131 extends through the serration 114. A nut 124 having a female screw 132 is coupled to the male screw 131. The male screw 131 extends through the serration 114 and then the nut 124 is coupled to the male screw 120 with the result that the hub 111 is coupled to the hub shaft 58.

At the hub 110 are formed openings 116, through which wash water, rinse water or water separated from laundry as the result of spin-drying flows and through which the hub shaft 58 extends.

At least a portion of each of the openings 116 communicates with the center hole 45 of the inner tub base 44 in the vertical direction so that wash water, rinse water or water separated from laundry as the result of spin-drying in the inner tub 10 flows to a space between the inner tub 10 and the outer tub 6 through the openings 116 and so that wash water or rinse water in the space between the inner tub 10 and the outer tub 6 flows into the inner tub 10 through the openings 116.

That is, wash water, rinse water or water separated from laundry as the result of spin-drying in the inner tub 10 flows to the space between the inner tub 10 and the outer tub 6 through the center hole 45 of the inner tub base 44, an opening 154 and through holes 156, which will be described below, formed at the lower balancer supporter 150, and the openings 116 of the hub 110. Also, wash water or rinse water in the space between the inner tub 10 and the outer tub 6 flows into the inner tub 10 through the openings 116 of the hub 110, the opening 154 and the through holes 156 of the lower balancer supporter 150, and the center hole 45 of the inner tub base 44.

The openings 116 are formed to be as large as possible to achieve rapid flow of water. Preferably, each of the openings 116 has a size to maximize the contact area between the hub 110 and the inner tub base 44.

The hub 110 is provided with through holes 118, through which the fastening members 112 extend.

The inner tub base 44 is provided with through holes 47, through which the fastening members 112 extend. The through holes 47 are formed so as to vertically correspond to the through holes 118 of the hub 110.

The lower balancer 48 includes a lower balancer body 48b, formed in the shape of a ring, having a ring-shaped space defined therein, open at the top thereof, a lower balancer cover 122 to cover the top of the lower balancer body 48b, and a ball 48a movable in the lower balancer body 48b.

The lower balancer 48 is inserted into the lower balancer supporter 150 and is fastened to the lower balancer supporter 150 by the fastening members 126.

The lower balancer 48 is provided at the outer circumference thereof with fastening parts 128 having fastening holes into which the fastening members 126 are fastened. The fastening holes of the fastening parts 128 are formed in the horizontal direction.

The lower balancer supporter 150 is fastened to the inner tub base 44 together with the hub 110.

A portion of the lower balancer supporter 150 is disposed between the hub 110 and the inner tub base 44 when the hub 110 is fastened to the inner tub base 44.

That is, the inner tub base 44, the lower balancer supporter 150 and the hub 110 are sequentially stacked in the vertical direction. When the hub 110 is fastened to the inner tub base 44 by the fastening members 112, the fastening members 112 extend through the hub 110, the lower balancer supporter 150 and the inner tub base 44 to integrally fix the hub 110, the lower balancer supporter 150 and the inner tub base 44.

The lower balancer supporter 150 is provided with through holes 160, through which the fastening members 112 extend.

The lower balancer supporter 150 is formed in a shape surrounding the bottom and outer circumferential surface of the lower balancer 48 not only to support the lower balancer 48 but also to prevent the lower balancer 48 from being separated or pushed in the radial direction.

The lower balancer supporter 150 includes a bottom plate part 151 partially disposed between the hub 110 and the inner tub base 44 and a hollow cylindrical part 152 bent from the bottom plate part 151 to surround the circumference of the lower balancer 48.

The bottom plate part 151 protects the lower side of the lower balancer supporter 150. The bottom plate part 151 is provided at the center thereof with an opening 154, through which wash water, rinse water or water separated from laundry as the result of spin-drying flows and through which the hub shaft 58 extends.

The lower balancer supporter 150 is provided with through holes 156, through which water, rinse water or water separated from laundry as the result of spin-drying is drained to the lower side of the lower balancer supporter 150 and through which water, rinse water or water separated from laundry as the result of spin-drying at the lower side of the lower balancer supporter 150 is introduced to the upper side of the lower balancer supporter 150. The through holes 156 are formed at the bottom plate part 151.

A ring-shaped strength reinforcing bead 158 is formed at the lower balancer supporter 150. The strength reinforcing bead 158 is provided to securely support the outside part of the lower balancer supporter 150. The strength reinforcing bead 158 is formed at the bottom plate part 151 in a protruding fashion.

The strength reinforcing bead 158 may be formed so that the strength reinforcing bead 158 can protrude downward or so that the strength reinforcing bead 158 can protrude upward.

In this embodiment, the strength reinforcing bead 158 protrudes downward. At the inner tub base 44 is formed a bead shape-matching part 49 shape-matched with the strength reinforcing bead 158 in a depressed fashion in a state in which the bead shape-matching part 49 avoids the strength reinforcing bead 158.

The bottom plate part 151 is fastened to the hub 110 and the inner tub base 44 by the fastening members 112. The through holes 160, through which the fastening members 112 extend, are formed in the bottom plate part 151 in the vertical direction.

The hollow cylindrical part 152 prevents the lower balancer 48 from being separated while supporting the lower balancer 48 when a portion of the lower balancer 48 is bent and thus load is applied to the lower balancer 48 during the rotation of the inner tub 10.

That is, when the lower balancer 48 is pushed in the leftward direction of FIG. 9 and is thus bent, the left side part of the hollow cylindrical part 152 supports the left side part of the lower balancer 48 so that the lower balancer 48 is not pushed in the leftward direction. On the other hand, when the lower balancer 48 is pushed in the rightward direction of FIG. 9 and is thus bent, the right side part of the hollow cylindrical part 152 supports the right side part of the lower balancer 48 so that the lower balancer 48 is not pushed in the rightward direction.

The hollow cylindrical part 152 is fastened to the lower balancer 48 by the fastening members 126. The hollow cylindrical part 152 is provided with through holes 162, through which the fastening members 126 extend, in the horizontal direction.

Hereinafter, the fastening members to fasten the hub 110, the bottom plate part 151 and the inner tub base 44 will be referred to as vertical fastening members 112, and the fastening members to fasten the hollow cylindrical part 152 and the lower balancer 48 will be referred to as horizontal fastening members 126, for the convenience of description.

Protrusions 119 are formed at the hub 110 or the lower balancer supporter 150, and protrusion insertion holes 164, into which the protrusions 119 are inserted upon assembly of the hub 110 and the lower balancer supporter 150, are formed at the lower balancer supporter 150 or the hub 110.

The protrusions 119 protrude from the hub 110 or the lower balancer supporter 150 toward the lower balancer supporter 150 or the hub 110. The protrusion insertion holes 164 are arranged at intervals so as to correspond to the protrusions 119.

The through holes 160 are formed at the lower balancer supporter 150 outside the opening 154 in the radial direction so that the through holes 160 are arranged at intervals in the circumferential direction. The strength reinforcing bead 158 is continuously formed at the lower balancer supporter 150 outside the through holes 160 in the radial direction so that the strength reinforcing bead 158 extends in the circumferential direction. The through holes 156 are formed at the lower balancer supporter 150 outside the strength reinforcing bead 158 in the radial direction so that the through holes 156 are arranged at intervals in the circumferential direction. The protrusion insertion holes 164 are formed at the lower balancer supporter 150 between the through holes 160 and the opening 154 so that the protrusion insertion holes 164 are arranged at intervals in the circumferential direction.

The lower balancer supporter 150 is formed of a material different from that of the hub 110. A frictional member 91 is disposed between the hub 110 and the lower balancer supporter 150.

The hub 110 may be formed of steel. The lower balancer supporter 150 may be formed of aluminum, the same material as the inner tub base 44.

The frictional member 91 is a film member attached to the bottom of the lower balancer supporter 150 so that the film member can rub against the top of the hub 110.

Hereinafter, a process of assembling the inner tub base, the hub, the lower balancer supporter and the lower balancer configured as described above will be described.

First, the lower balancer 48 is inserted into the lower balancer supporter 150, and the through holes 162 formed at the hollow cylindrical part 152 of the lower balancer supporter 150 are aligned with the fastening holes of the fastening parts 128 formed at the lower balancer 48 in the horizontal direction.

When the horizontal fastening members 126 are fastened into the fastening holes of the fastening parts 128 formed at the lower balancer 48 through the through holes 162 formed at the hollow cylindrical part 152 of the lower balancer supporter 15, the lower balancer 48 and the lower balancer supporter 150 are integrally assembled. At this time, the lower balancer supporter 150 surrounds the bottom and outer circumferential surface of the lower balancer 48.

Subsequently, the lower balancer supporter 150 is placed at the upper side of the hub 110 so that the frictional member 91 comes into contact with the hub 110. When the protrusions 119 formed at the hub 110 in a protruding fashion are inserted into the protrusion insertion holes 164 formed at the lower balancer supporter 150, the lower balancer supporter 150 is temporarily assembled with the hub 110, by which assembly positions are decided.

In a state in which the hub 110 and the lower balancer supporter 150 are temporarily assembled as described above, the inner tub base 44 is placed above the lower balancer supporter 150, the lower balancer 48 and the hub 110, and the inner tub base 44, the lower balancer supporter 150 and the hub 110 are fastened by the vertical fastening members 116.

The vertical fastening members 116 sequentially extend through the through holes 118 of the hub 110, the through holes 160 of the lower balancer supporter 150 and the through holes 47 of the inner tub base 44.

Hereinafter, the operation of the washing machine with the above-stated construction according to the embodiment of the present invention will be described.

First, upon rotation of the hub shaft 58, rotational force transmitted to the hub shaft 58 is distributed to the hub 110 with the result that the rotational force is transmitted to a plurality of portions of the inner tub base 44, and the inner tub body 42, the upper balancer 46, the inner tub base 44, the lower balancer supporter 150, the lower balancer 48 and the hub 110 are simultaneously rotated.

During the rotation of the inner tub 10, the inner tub 10 may become unbalanced. At this time, the fluid contained in the upper balancer 46 and the balls disposed in the lower balancer 48 move in a direction in which the unbalancing of the inner tub 10 is solved. The lower balancer supporter 150 prevents the lower balancer 48 from being pushed and bent in a specific direction.

Meanwhile, during the rotation of the inner tub 10, wash water flows through the center hole 45 of the inner tub base 44, the opening 154 and the through holes 156 of the lower balancer supporter 150, and the openings 116 of the hub 110 with the result that cleaning power of the wash water is increased.

Figure 10:
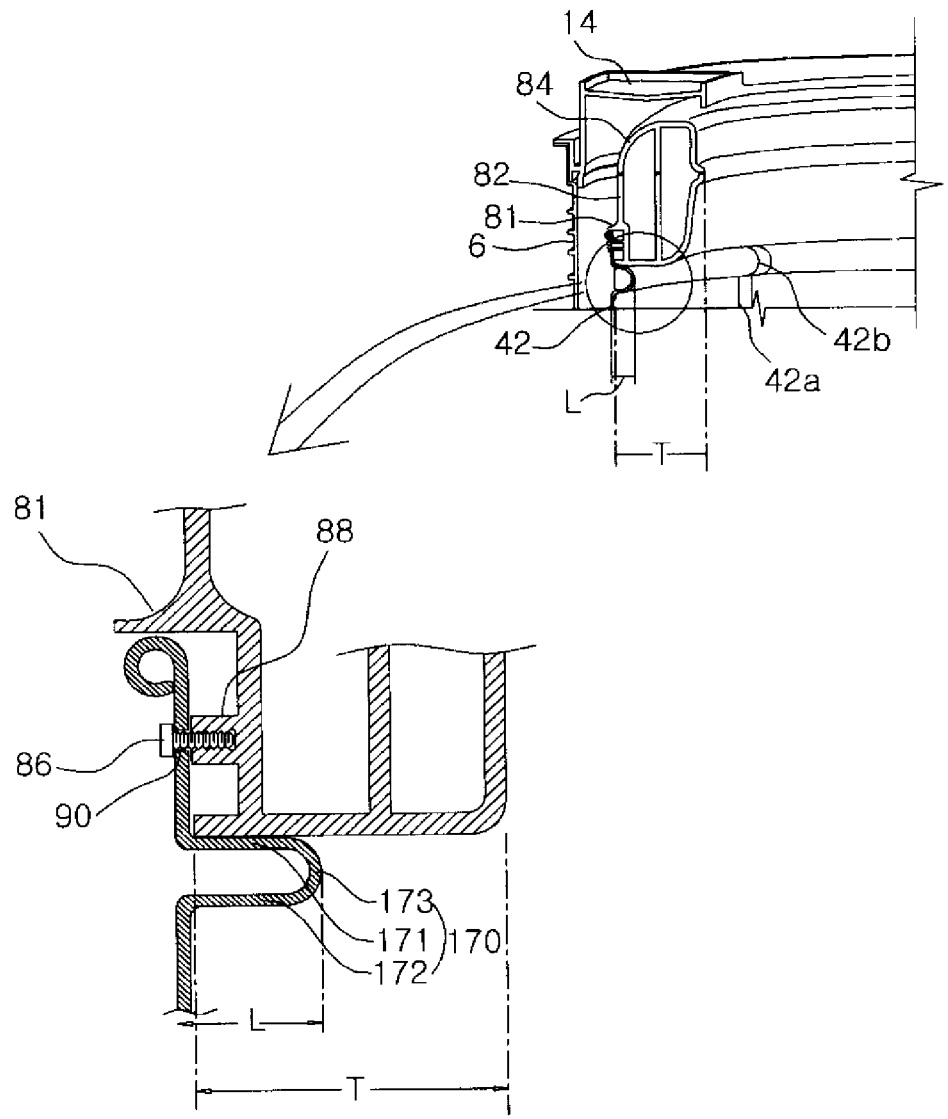
FIG. 10 is an enlarged perspective view, partially cutaway, showing an inner tub and an upper balancer shown in FIG. 6.

FIG. 10 is an enlarged perspective view, partially cutaway, showing the inner tub and the upper balancer shown in FIG. 6.

Referring to FIG. 10, the beaded part 170 of the inner tub 10 preferably protrudes to have a protruding width L less than or equal to the thickness T of the upper balancer 46.

As the contact area between the upper balancer 46 and the beaded part 170 is increased, the upper balancer 46 is more stably supported by the beaded part 170. If the protruding width of the beaded part 170 is too large, however, the beaded part 170 may obstruct the introduction and removal of laundry or may damage the laundry. Most preferably, therefore, the beaded part 170 protrudes to have a protruding width L greater than or equal to $1/5$ of the thickness T of the upper balancer 46 and less than or equal to the thickness T of the upper balancer 46, at which the upper balancer 46 can be stably supported by the beaded part 170 while the introduction and removal of laundry are not obstructed or the laundry is not damaged.

The inner tub body 42 is manufactured as follows. A rectangular plate is rolled in the shape of a hollow cylinder in a state in which left and right ends of the rectangular plate overlap each other, the overlap portions are joined to each other by seaming or welding, and a beaded part 170 is formed at the upper part of the inner tub body 42.

When the beaded part 170 is formed at the upper part of the inner tub body 42 after the overlap portions are joined to each other by seaming, a portion of the seamed part, forming the beaded part 170, and the remaining portion of the seamed part are separated from each other. For this reason, the beaded part 170 is preferably formed at the upper part of the inner tub body 42 after the overlap portions are joined to each other by welding.

That is, a long welded part 42a is formed at one side of the circumference of the inner tub body 42 in the vertical direction. An upper portion 42b of the welded part 42a is bent toward the inside of the inner tub body 42 in a protruding fashion to form a beaded part 170.

The beaded part 170 includes upper and lower bent parts 171 and 172 formed at the upper and lower parts of the inner tub body 42 so that the upper and lower bent parts 171 and 172 are spaced apart from each other and a round part 173 interconnecting the upper and lower bent parts 171 and 172.

The upper bent part 171 of the beaded part 170 is formed horizontally so that the bottom plate part of the upper balancer 46 comes into surface contact with the upper bent part 171 when the upper balancer 46 is placed on the upper bent part 171.

The lower bent part 172 of the beaded part 170 is inclined upward toward the inside of the inner tub body 42 so that laundry can be easily drawn along the lower bent part 172 and so that, during a beading process, a tool used in the beading process can easily be removed from a space between the upper bent part 171 and the lower bent part 172.

The upper balancer 46 includes a balancer body 82 open at the top thereof so that a fluid can be contained in the balancer body 82 through the top thereof and a balancer cover 84 coupled to the balancer body 82 to cover the top of the balancer body 82.

The upper end of the upper balancer 46 is located higher than the upper end of the inner tub body 42 when the upper balancer 46 is placed on the beaded part 170.

The upper balancer 46 is provided at the outer circumference thereof with a catching part 81 protruding in the shape of a ring. The catching part 81 is caught by the upper end of the inner tub body 42 downward.

The catching part 81 protrudes from the outer circumference of the balancer body 82 in the radial direction.

The upper balancer 46 is fastened to the inner tub body 42 by fastening members 86, such as screws.

Fastening parts 88, to which the fastening members 86, such as screws, are fastened, are formed at the upper balancer 46 or the inner tub body 42. Through holes 90, through which the fastening members 86, such as screws, extend, are formed at the inner tub body 42 or the upper balancer 46. The fastening members 86, such as screws, are coupled to the fastening parts 88 through the through holes 90.

The fastening parts 88 and the through holes 90 are arranged at intervals in the radial direction of the upper balancer 46 and the inner body 42.

When the fastening parts 88 are formed at the upper balancer 46, the through holes 90 are formed at the inner tub body 42 above the beaded part 170. On the other hand, when the through holes 90 are formed at the upper balancer 46, the fastening parts 88 are formed at the inner tub body 42 above the beaded part 170.

Hereinafter, the operation of the washing machine with the above-stated construction according to the embodiment of the present invention will be described.

First, when the motor 54 is driven, and the clutch 60 is operated in a pulsator and inner tub rotation mode, the pulsator shaft 56 and the hub shaft 58 are simultaneously rotated, the pulsator 9 and the inner tub 10 are simultaneously rotated, and the fluid in the upper balancer 46 is moved to keep the inner tub 10 balanced.

During the rotation of the inner tub 10, the upper part of the inner tub 10 is prevented from being bent or twisted since the strength of the inner tub 10 is increased by the beaded part 170. As a result, the inner tub 10 is stably rotated while collision between the inner tub 10 and the outer tub 6 is minimized.

Hereinafter, a process of assembling the upper balancer 46 will be described.

First, the upper balancer 46 is located above the inner tub body 42 at which the beaded part 170 is formed, and the upper balancer 46 is placed on the beaded part 170. As a result, the upper balancer 46 comes into surface contact with the beaded part 170. At this time, the fastening parts 88 are located at the same height as the through holes 90.

If the through holes 90 are not aligned with the fastening parts 88 when the upper balancer 46 is placed on the beaded part 170, the upper balancer 46 is rotated to align the through holes 90 with the fastening parts 88. At this time, the through holes 90 are easily aligned with the fastening parts 88 while the height of the upper balancer 46 is not changed since the upper balancer 46 is placed on the beaded part 170.

Subsequently, the fastening members 86, such as screws, are fastened to the fastening parts 88 through the through holes 90. As a result, the upper balancer 46 is securely fixed to the inner tub body 42 in a state in which the outer circumference and bottom of the upper balancer 46 are in contact with the inner tub body 42.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to various laundry processing apparatuses, such as a washing machine, a drying machine and a washing and drying machine, wherein an inner tub is rotated to process laundry contained in the inner tub.

The invention claimed is:
1. A laundry processing apparatus comprising:
a cabinet;
an outer tub provided in the cabinet to contain water;
an inner tub rotatably provided in the outer tub to contain laundry, the inner tub comprising:
an inner tub base forming a bottom of the inner tub, the inner tub base being provided with a ring-shaped lower balancer receiving part which is depressed along a circumference of the inner tub base; and
an inner tub body disposed at an upper side of the inner tub base;
a hub transferring rotational force to the inner tub, the hub fastened to the inner tub base at a lower side of the inner tub base;
a ring-shaped upper balancer disposed at the inner tub body;
a ring-shaped lower balancer disposed in the lower balancer receiving part;
a lower balancer supporter securing the lower balancer in the lower balancer receiving part, the lower balancer supporter comprising:
a first part at least partially disposed between the hub and the inner tub base; and
a second part extended radially outwardly from the first part and forming an annular groove which surrounds an outer circumference of the lower balancer,
wherein the inner tub base, the hub and the first part of the lower balancer supporter are fastened together by a first fastening member, and the second part of the lower balancer supporter and the outer circumference of the lower balancer are fastened together by a second fastening member, and
wherein one of the upper and lower balancers comprises a hydraulic balancer having liquid contained therein, and the other comprises a ball balancer having balls contained therein.

2. The laundry processing apparatus according to claim 1, wherein a vertical distance between a center of gravity of the inner tub and the ball balancer is less than a vertical distance between a center of gravity of the inner tub and the hydraulic balancer.

3. The laundry processing apparatus according to claim 1, wherein the upper balancer comprises the hydraulic balancer, and the lower balancer comprises the ball balancer.

4. The laundry processing apparatus according to claim 3, wherein a vertical distance between a center of gravity of the inner tub and the lower balancer is less than a vertical distance between a center of gravity of the inner tub and the upper balancer.

5. The laundry processing apparatus according to claim 3, wherein the upper balancer has a vertical thickness less than that of the lower balancer.

6. The laundry processing apparatus according to claim 5, wherein the upper balancer and the lower balancer have the same width in a radial direction.

7. The laundry processing apparatus according to claim 1, wherein the second part is bent upward from the first part to surround the outer circumference of the lower balancer.

8. The laundry processing apparatus according to claim 1, wherein protrusions are formed at the hub or the lower balancer supporter, and protrusion insertion holes, into which the protrusions are inserted upon assembly of the hub and the lower balancer supporter, are formed at the lower balancer supporter or the hub.

9. The laundry processing apparatus according to claim 1, wherein the lower balancer supporter has through holes, through which wash water flows between the inner tub and the outer tub.

10. The laundry processing apparatus according to claim 1, wherein the lower balancer supporter is provided with a ring-shaped strength reinforcing bead.

11. A laundry processing apparatus comprising:
a cabinet;
an outer tub provided in the cabinet to contain water;
an inner tub rotatably provided in the outer tub to contain laundry;
an upper balancer disposed at an upper part of the inner tub;
a lower balancer disposed at a lower part of the inner tub,
wherein one of the upper and lower balancers comprises a hydraulic balancer having liquid contained therein, and the other comprises a ball balancer having balls contained therein,
a hub fastened to a bottom of the inner tub; and
a lower balancer supporter provided between the inner tub and the hub to support the lower balancer, wherein the hub and the lower balancer supporter are formed of different materials, and wherein the laundry processing apparatus further comprises a frictional member disposed between the hub and the lower balancer supporter.

12. The laundry processing apparatus according to claim 11, wherein the frictional member comprises a film member formed at a bottom of the lower balancer supporter so that the film member can rub against a top of the hub.

13. A laundry processing apparatus comprising:
a cabinet;
an outer tub provided in the cabinet to contain water;
an inner tub rotatably provided in the outer tub to contain laundry, the inner tub comprising:
   an inner tub base forming a bottom of the inner tub; and
   an inner tub body disposed at an upper side of the inner tub base;
a ring-shaped upper balancer disposed at an upper part of the inner tub; and
a ring-shaped lower balancer disposed at a lower part of the inner tub,
wherein the inner tub body is provided at an upper part thereof with a beaded part protruding inward,
wherein the upper balancer is placed on the beaded part so that the upper balancer is supported by the beaded part,
wherein the beaded part comprises:
   upper and lower bent parts formed at the inner tub body so that the upper and lower bent parts are spaced apart from each other; and
   a round part interconnecting the upper and lower bent parts, and
wherein the upper balance is placed on the upper bent part, and
wherein a through hole is formed at the inner tub body at an upper side of the beaded part through which a fastening member is coupled to an outer circumference of the upper balancer.

14. The laundry processing apparatus according to claim 13, wherein the upper bent part is horizontal.

15. The laundry processing apparatus according to claim 14, wherein the upper bent part is inclined.

16. The laundry processing apparatus according to claim 13, wherein the inner tub body is provided at one side of a circumference thereof with a welded part, a portion of the welded part constituting the beaded part.

17. The laundry processing apparatus according to claim 13, wherein the beaded part protrudes to have a width less than or equal to a thickness of the upper balancer.

* * * * *